(12) United States Patent
Kim et al.

(10) Patent No.: US 12,465,879 B2
(45) Date of Patent: Nov. 11, 2025

(54) AIR PURIFICATION MODULE AND AIR PURIFICATION SYSTEM INCLUDING THE SAME

(71) Applicant: Samsung Electronics Co., Ltd., Suwon-si (KR)

(72) Inventors: Mijong Kim, Suwon-si (KR); Dongjin Ham, Suwon-si (KR); Hyukjae Kwon, Suwon-si (KR); Hyun Chul Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 449 days.

(21) Appl. No.: 18/113,911

(22) Filed: Feb. 24, 2023

(65) Prior Publication Data

US 2024/0091692 A1    Mar. 21, 2024

(30) Foreign Application Priority Data

Sep. 21, 2022    (KR) .......................... 10-2022-0119549

(51) Int. Cl.
*B01D 46/00* (2022.01)
*A61L 9/014* (2006.01)
*A61L 9/20* (2006.01)
*B01D 39/20* (2006.01)
*B01D 46/24* (2006.01)
(Continued)

(52) U.S. Cl.
CPC .......... *B01D 46/0028* (2013.01); *A61L 9/014* (2013.01); *A61L 9/20* (2013.01); *B01D 39/2068* (2013.01); *B01D 46/24* (2013.01); *B01D 46/62* (2022.01); *B01D 53/885* (2013.01); *A61L 2209/12* (2013.01); *A61L 2209/14* (2013.01); *B01D 2239/0442* (2013.01); *B01D 2255/802* (2013.01); *B01D 2255/915* (2013.01); *B01D 2259/804* (2013.01); *B01D 2279/65* (2013.01)

(58) Field of Classification Search
CPC ........................... A61L 9/205; B01D 46/0028
See application file for complete search history.

(56) References Cited

U.S. PATENT DOCUMENTS

2006/0283160 A1\*  12/2006  Johnson ................. B01D 29/21
                                                                           55/498
2017/0274364 A1    9/2017  Idriss et al.
(Continued)

FOREIGN PATENT DOCUMENTS

| CN | 112657332 A | 4/2021 |
|---|---|---|
| KR | 1020030043627 A | 6/2003 |
| KR | 1020060017573 A | 2/2006 |

*Primary Examiner* — Kevin Joyner
(74) *Attorney, Agent, or Firm* — CANTOR COLBURN LLP

(57) ABSTRACT

An air purification module which purifies introduced unpurified air and discharge purified air, includes a first filter supporter extending in a first direction and having a penetrating shape including a first hollow region, a first filter which is supported by the first filter supporter and penetrates a side portion of the first filter supporter, a second filter supporter extending in the first direction, having a penetrating shape including a second hollow region, and disposed in the first hollow region, a second filter which is supported by the second filter supporter and penetrates a side portion of the second filter supporter, and a light source module disposed in the second hollow region.

20 Claims, 9 Drawing Sheets

(51) Int. Cl.
    *B01D 46/62*     (2022.01)
    *B01D 53/88*     (2006.01)

(56) References Cited

U.S. PATENT DOCUMENTS

| | | |
|---|---|---|
| 2017/0326264 A1 | 11/2017 | Kim et al. |
| 2018/0050124 A1 | 2/2018 | Lee |
| 2021/0052764 A1* | 2/2021 | Terkelsen ................ A61L 9/20 |
| 2022/0111085 A1 | 4/2022 | Pan |
| 2024/0042089 A1 | 2/2024 | Ham et al. |

* cited by examiner

AIR PURIFICATION MODULE AND AIR PURIFICATION SYSTEM INCLUDING THE SAME

This application claims priority to Korean Patent Application No. 10-2022-0119549, filed on Sep. 21, 2022, and all the benefits accruing therefrom under 35 U.S.C. § 119, the content of which in its entirety is herein incorporated by reference.

BACKGROUND

1. Field

The disclosure relates to an air purification module which purifies pollutants and fine dust in a gas, and an air purification system including the same.

2. Description of the Related Art

An air purification apparatus purifies a gas, e.g., air, by collecting or decomposing pollutants or fine dust in air. The air purification apparatus may be applied to an industrial dust collecting facility or an air conditioning/ventilation system in a building.

Unpurified air contains various pollutants, and thus to remove the various pollutants, the pollutants are adsorbed by a porous material having a wide predetermined surface area or the pollutants are decomposed by a catalyst. A stage of removing the pollutants by a filter including the porous material and a stage of decomposing the pollutants by the catalyst may be performed in one air purification apparatus, for example.

The air purification apparatus may additionally include the filter for removing the pollutant by adsorbing the pollutants, a photocatalyst activated by an irradiated light, and a separate light source for activating the photocatalyst.

SUMMARY

Because the air purification apparatus includes the filter, the photocatalyst, and the light source, a structure of the air purification apparatus may become complicated, a volume of the air purification apparatus may be increased, and energy efficiency of the air purification apparatus may deteriorate.

Provided is an air purification module capable of improving a purification performance regarding pollutants by including a purifier of a plurality of stages.

Provided is an air purification module capable of increasing a time during which contaminated air is exposed to an activated photocatalyst, by dividing a region where the contaminated air passes through into a plurality of regions and decreasing flow velocity of the contaminated air while the contaminated air passes through the plurality of regions.

Provided is an air purification module having an enhanced energy efficiency by dividing a region where contaminated air passes through into a plurality of regions and arranging a light source module in one of the plurality of regions.

Additional features will be set forth in part in the description which follows and, in part, will be apparent from the description, or may be learned by practice of the presented embodiments of the disclosure.

In an embodiment of the disclosure, an air purification module which purifies introduced unpurified air and discharge purified air, includes a first filter supporter extending in a first direction and having a penetrating shape including a first hollow region, a first filter which is supported by the first filter supporter and penetrates a side portion of the first filter supporter, a second filter supporter extending in the first direction, having a penetrating shape including a second hollow region, and disposed in the first hollow region, a second filter which is supported by the second filter supporter and penetrates a side portion of the second filter supporter, and a light source module disposed in the second hollow region.

In an embodiment, at least one of the first filter and the second filter may include at least one of a ceramic filter, a high-efficiency particulate air ("NEPA") filter, a prefilter, and a fabric filter, which include micro pores.

In an embodiment, the first filter may include a (1-1)th filter surface disposed at an upstream of an air flow and a (1-2)th filter surface disposed at a downstream of the air flow, the second filter may include a (2-1)th filter surface disposed at the upstream of the air flow and a (2-2)th filter surface disposed at the downstream of the air flow, a thickness of the first filter extending from the (1-1)th filter surface to the (1-2)th filter surface may be between about 0.1 centimeter (cm) and about 100 cm, and a thickness of the second filter extending from the (2-1)th filter surface to the (2-2)th filter surface may be between about 0.1 cm and about 100 cm.

In an embodiment, the first filter may include a (1-1)th filter surface disposed at an upstream of an air flow and a (1-2)th filter surface disposed at a downstream of the air flow, and at least one of copper (Cu), Cu alloy, silver (Ag), and platinum (Pt) may be coated on at least one of the (1-1)th filter surface and the (1-2)th filter surface.

In an embodiment, the unpurified air may define a flow path of air from the (1-1)th filter surface, the (1-2)th filter surface, the first hollow region, the (2-1)th filter surface, and the (2-2)th filter surface to the second hollow region.

In an embodiment, a ratio of a cross-sectional area of a cross-sectional area of a second cross section of the second filter supporter cut along one plane perpendicular to the first direction to a first cross section of the first filter supporter cut along one plane perpendicular to the first direction may be between 0.01 and 0.99.

In an embodiment, a shape of a first cross section of the first filter supporter cut along one plane perpendicular to the first direction and a shape of a second cross section of the second filter supporter cut along one plane perpendicular to the first direction may include at least one of a circle, an oval, and a polygon.

In an embodiment, the second filter may include a (2-1)th filter surface disposed at an upstream of the air flow, and at least one of Cu, Cu alloy, Ag, and Pt may be coated on the (2-1)th filter surface.

In an embodiment, the second filter may include a (2-2)th filter surface disposed at a downstream of the air flow, and a photocatalyst may be coated on the (2-2)th filter surface.

In an embodiment, the photocatalyst may include at least one of a metal, a metal oxide, a metal carbide, a metal nitride, a metal oxynitride, the metal may include at least one of titanium (Ti), zinc (Zn), zirconium (Zr), tantalum (Ta), niobium (Nb), tungsten (W), copper (Cu), platinum (Pt), gold (Au), silver (Ag), palladium (Pd), the photocatalyst may include a particle, the particle may have at least one of a sphere shape, a tube shape, a bar shape, a fiber shape, a sheet shape, and the particle may be a primary particle or a secondary particle that is a combination of a plurality of primary particles.

In an embodiment, light irradiated from the light source module may include at least one of radio waves, microwaves, ultraviolet light, visible light, infrared light, x-rays, which activates the photocatalyst.

In an embodiment, a light source included in the light source module may include at least one of an incandescent lamp, a halogen lamp, a fluorescent lamp, a mercury lamp, a fluorescent mercury lamp, a metal halide lamp, a xenon lamp, a low-pressure sodium lamp, a high-pressure sodium lamp, and a light-emitting diode ("LED").

In an embodiment, the light source module may include light sources extending in the first direction. The light sources may be spaced apart from each other at predetermined intervals in a second direction or a third direction perpendicular to the first direction.

In an embodiment, the light source module may include light sources extending in a second direction or a third direction perpendicular to the first direction. The light sources may be spaced apart from each other at predetermined intervals in the first direction.

In another embodiment of the disclosure, an air purification system includes a first air purification module which has the same structure as that of the air purification module described above, and an air discharge module disposed at a downstream of an air flow compared to the first air purification module.

In an embodiment, the air purification system may further include a second air purification module disposed between the first air purification module and the air discharge module. The second air purification module may include a catalyst filter and a light-emitting heat source.

In an embodiment, the catalyst filter may include a photocatalyst and an oxidation catalyst, and the light-emitting heat source may irradiate light activating the photocatalyst and provide heat activating the oxidation catalyst.

In an embodiment, the first filter or the second filter may be a ceramic filter including micro pores.

In an embodiment, the second filter may include a (2-1)th filter surface disposed at an upstream of an air flow, and copper may be coated on the (2-1)th filter surface.

In an embodiment, the second filter may include a (2-2)th filter surface disposed at a downstream of an air flow, and a photocatalyst may be coated on the (2-2)th filter surface.

BRIEF DESCRIPTION OF THE DRAWINGS

The above and other features and advantages of illustrative embodiments of the disclosure will be more apparent from the following description taken in conjunction with the accompanying drawings, in which.

DETAILED DESCRIPTION

Figure 1:
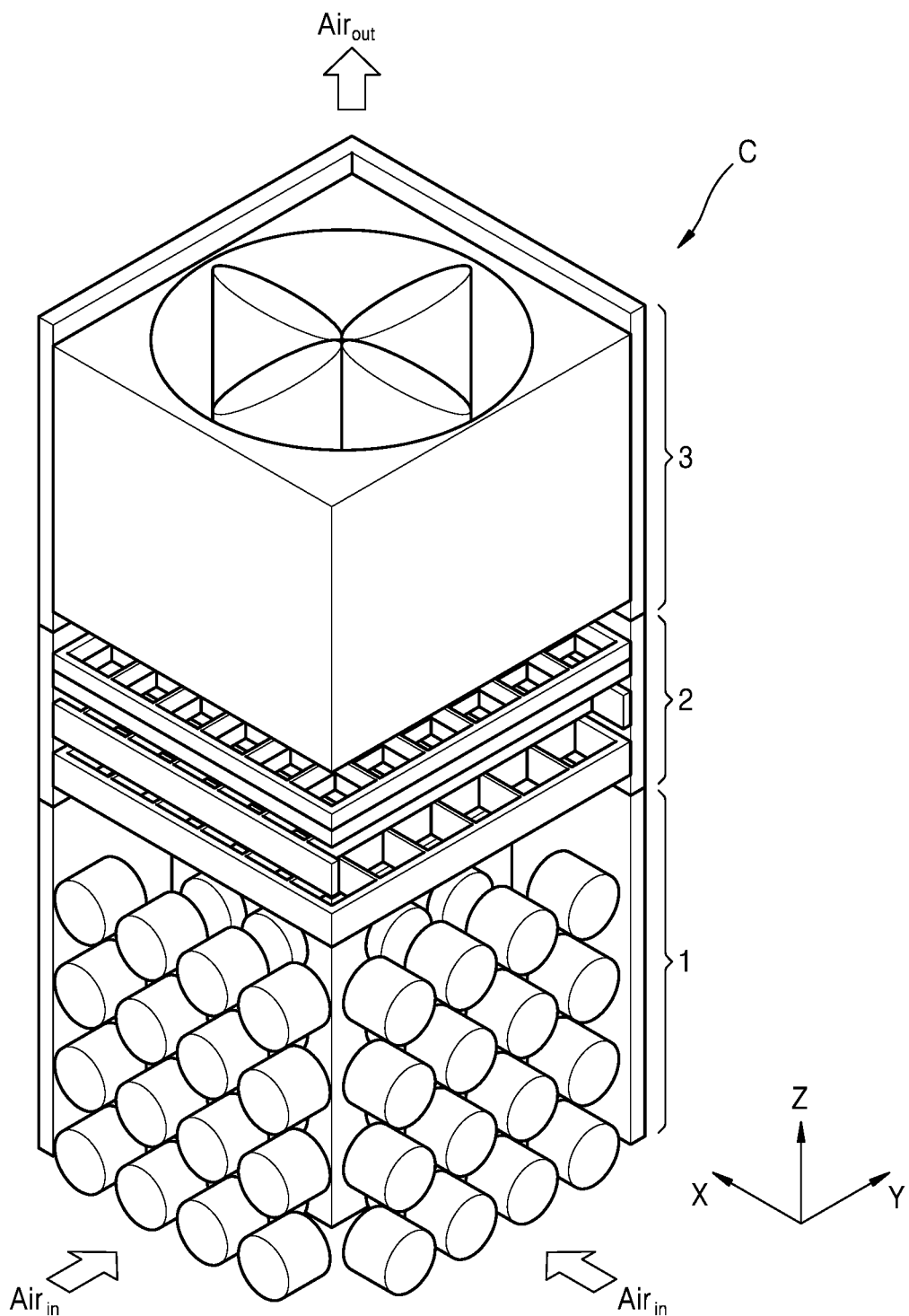
FIG. 1 is a schematic view of an embodiment of an air purification system.

The inventive concept described below may have various changes and various embodiments, and particular embodiments will be described in detail with reference to the drawings. However, this is not intended to limit the inventive concept to particular modes of practice, and it will be understood that all changes, equivalents, and substitutes that do not depart from the technical scope of the inventive concept are encompassed in the inventive concept.

Also, the terms used in the specification are only used to describe illustrative embodiments, and are not intended to limit the inventive concept. An expression used in the singular encompasses the expression in the plural, unless it has a clearly different meaning in the context. Hereinbelow, it is to be understood that terms such as "including", "having", etc., are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. Hereinbelow, "I" used herein may be interpreted as "and" or may be interpreted as "or" according to circumstances. As used herein, the term "and/or" includes any and all combinations of one or more of the associated listed items.

In the drawings, thicknesses may be exaggerated or reduced to clearly represent several layers and regions. Throughout the specification, like reference numerals denote like elements. Throughout the specification, when a part, such as a layer, a film, a region, or a plate, is "on" or "above" another part, the part may be directly on the other part or an intervening part may be therebetween. Throughout the specification, the terms as "first", "second", etc., may be used to describe various components, such components must not be limited to the above terms. The above terms are used only to distinguish one component from another. In the specification and drawings, like reference numerals denote like components having substantially same functions, and redundant descriptions are omitted.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Hereinafter, an air purification module and an air purification system including the same, in embodiments, will be described in detail.

FIG. 1 is a schematic view of an embodiment of an air purification system C.

Referring to FIG. 1, the air purification system C in an embodiment may include a first air purification module 1, a second air purification module 2, and an air discharge module 3, which are arranged along a flow of unpurified air $Air_{in}$. In an embodiment, the unpurified air $Air_{in}$ denotes a mixed gas including air and one or more of fine dust, water soluble organic compound, and water insoluble organic compound, for example. In an embodiment, the fine dust may include substantially small fine dust equal to or smaller than about 10 micrometers (μm) and ultrafine dust equal to or smaller than about 2.5 μm, for example. Also, the water soluble organic compound is a volatile organic component and may include a gas material that may be collected and removed in water or an aqueous solution. The water insoluble organic compound may include a volatile organic compound that is not collected in water or an aqueous solution. However, the disclosure is not limited thereto, and any gas other than fine dust, water soluble organic compound, and water insoluble organic compound may be included in the unpurified air $Air_{in}$.

The first air purification module 1 in an embodiment is an air purifier into which the unpurified air $Air_{in}$ is introduced and primarily purifying the unpurified air $Air_{in}$. In an embodiment, the first air purification module 1 may include an air inflow portion into which the unpurified air $Air_{in}$ may be introduced, for example. The air inflow portion is a path through which the unpurified air $Air_{in}$ may enter.

In an embodiment, the air inflow portion may be disposed in a form of an opening at any location that may introduce the unpurified air $Air_{in}$ to a first filter 10 (refer to FIG. 2) disposed at the first air purification module 1. Also, a pump (not shown), for example, may be disposed at the first air purification module 1 and accordingly, negative pressure may be generated such that the unpurified air $Air_{in}$ is introduced to the air inflow portion. When the air discharge module 3 described below, the first air purification module 1, and the second air purification module 2 define one fluid flow, in an embodiment, the unpurified air $Air_{in}$ may be introduced to the air inflow portion according to negative pressure generated by the air discharge module 3.

The first air purification module 1 in an embodiment may adsorb fine dust included in the unpurified air $Air_{in}$ and remove the fine dust. Also, the first air purification module 1 may decompose water soluble organic compound and water insoluble organic compound included in the unpurified air $Air_{in}$ and remove the water soluble organic compound and the water insoluble organic compound. Technical features related to primarily purifying the unpurified air $Air_{in}$ by the first air purification module 1 will be described below with reference to FIGS. 2 through 8.

The second air purification module 2 is an air purifier that receives primarily purified air from the first air purification module 1 and secondarily purifies the same. The second air purification module 2 in an embodiment may be disposed at an upstream of a flow of air compared to the first air purification module 1. In an embodiment, the second air purification module 2 may be provided between the first air purification module 1 and the air discharge module 3, for example. However, the disclosure is not limited thereto, and the second air purification module 2 may not be provided between the first air purification module 1 and the air discharge module 3.

In an embodiment, the second air purification module 2 may include one or more catalyst filters and one or more light-emitting heat sources. In an embodiment, the one or more catalyst filters may include a photocatalyst and an oxidation catalyst. Also, in an embodiment, the one or more light-emitting heat sources may irradiate light for activating the photocatalyst and provide heat for activating the oxidation catalyst. The second air purification module 2 may decompose and remove water soluble organic compound and water insoluble organic compound included in air unpurified by the first air purification module 1, by the activated photocatalyst and oxidation catalyst.

The air discharge module 3 may be provided at a downstream of the air flow compared to the first air purification module 1 and the second air purification module 2, and discharge air purified by the first air purification module 1 and second air purification module 2 to the outside of the air purification system C. The air discharge module 3 in an embodiment may include a fan and/or an air duct, for example. Hereinafter, the technical features related to primarily purifying the unpurified air $Air_{in}$ by the first air purification module 1 will be described in detail.

Figure 2:
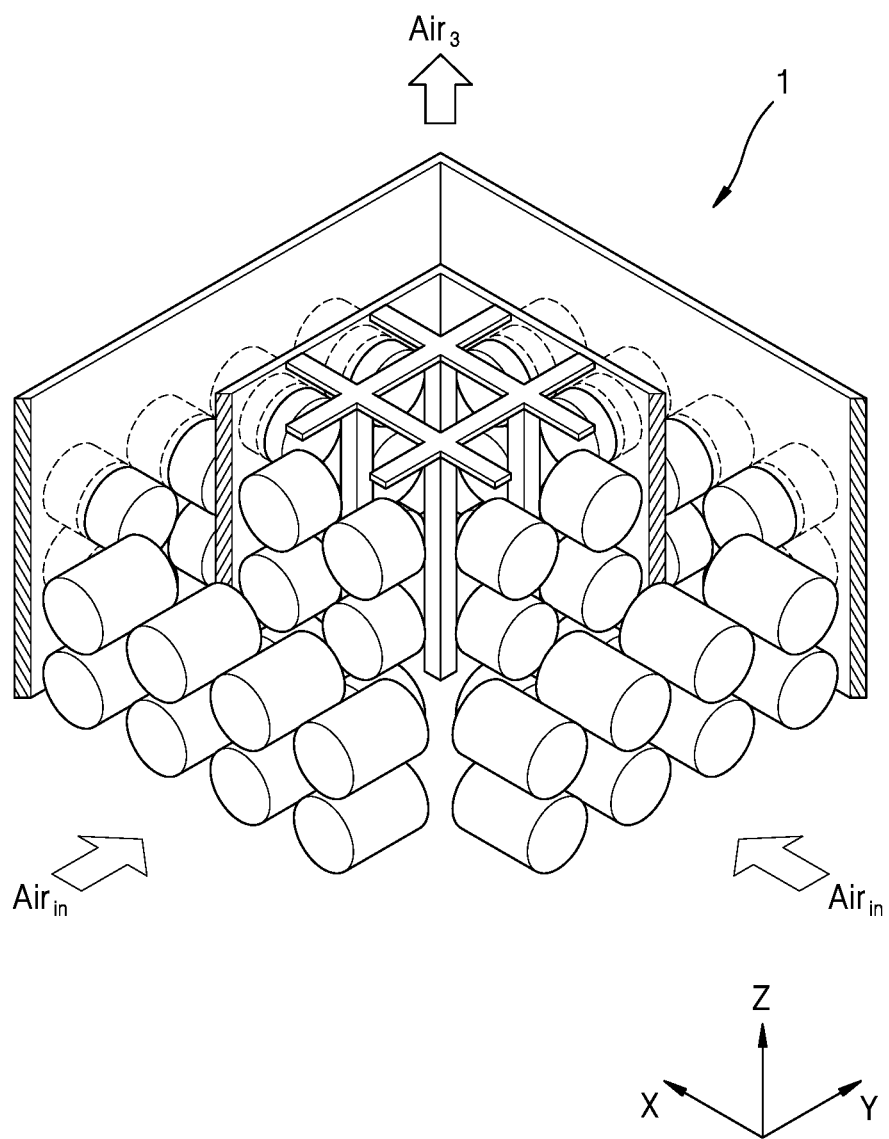
FIG. 2 is a perspective view of an embodiment of an air purification module.
Figure 3:
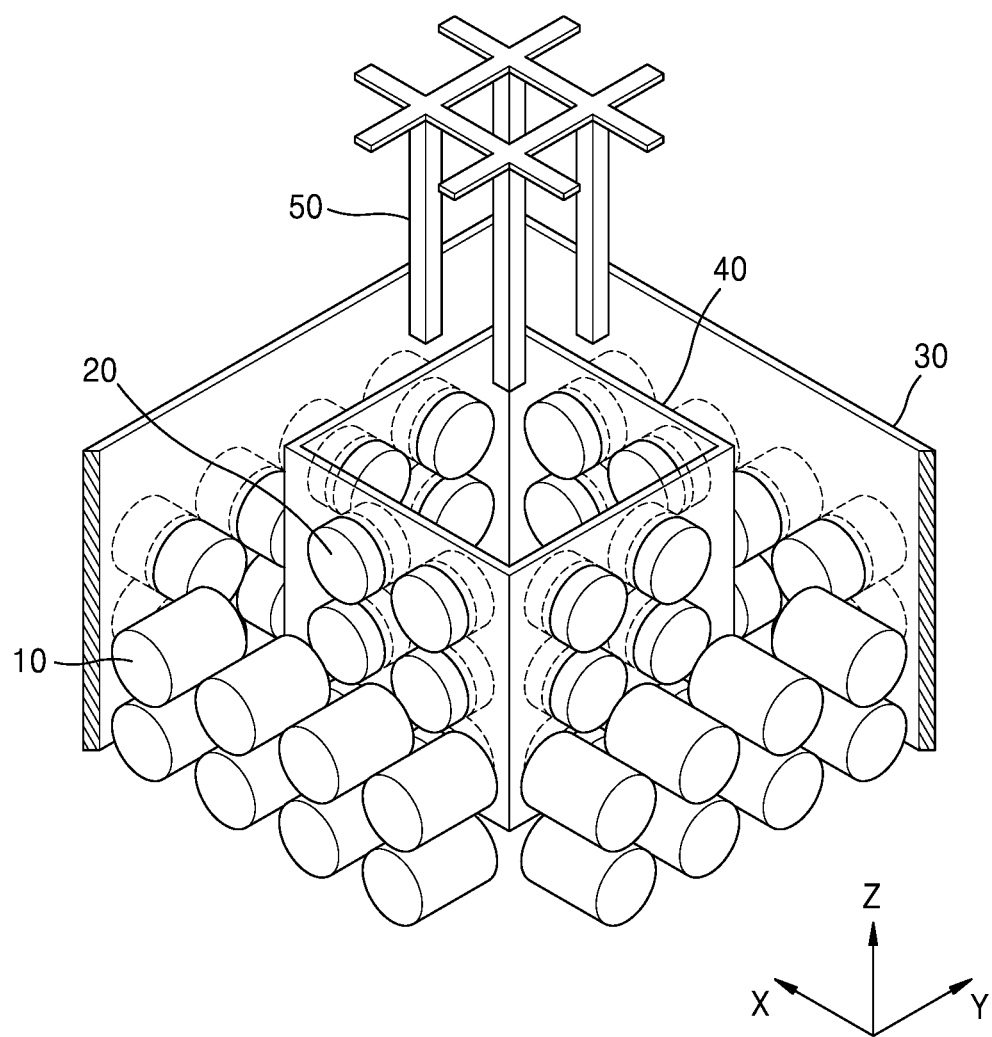
FIG. 3 is an exploded perspective view of an embodiment of the air purification module of FIG. 2.
Figure 4:
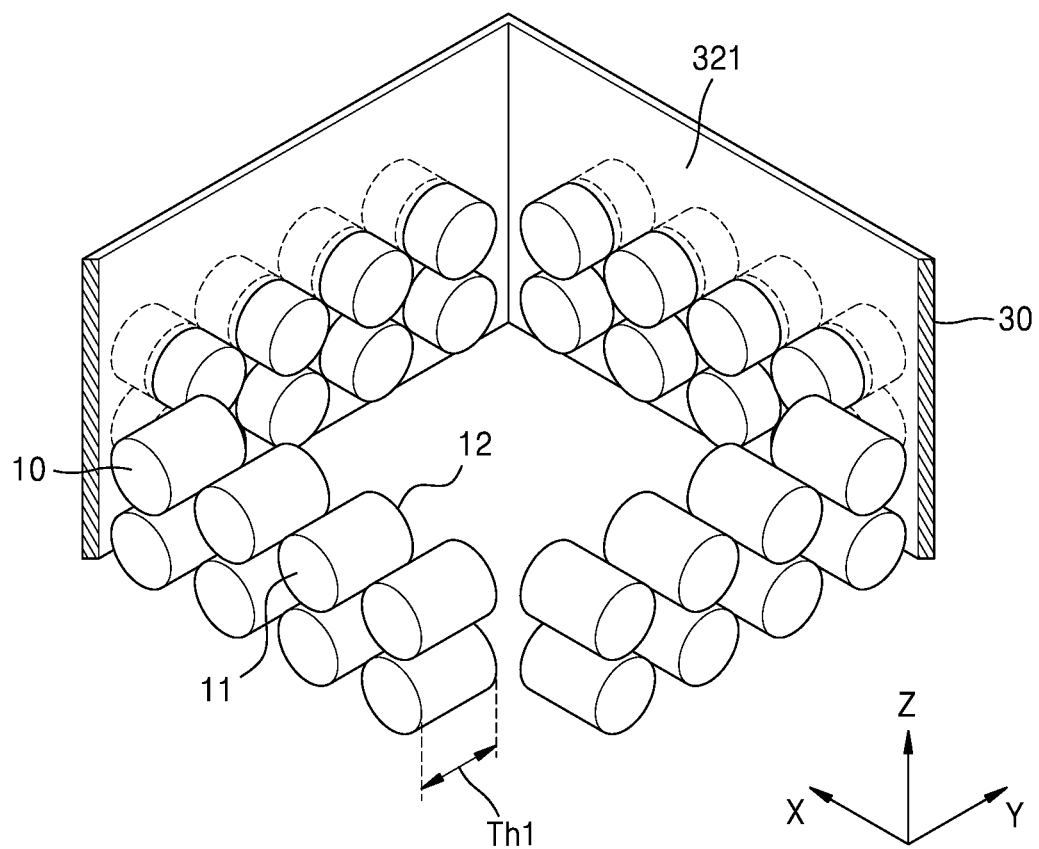
FIG. 4 is a perspective view of an embodiment of a first filter and a first filter supporter.
Figure 5:
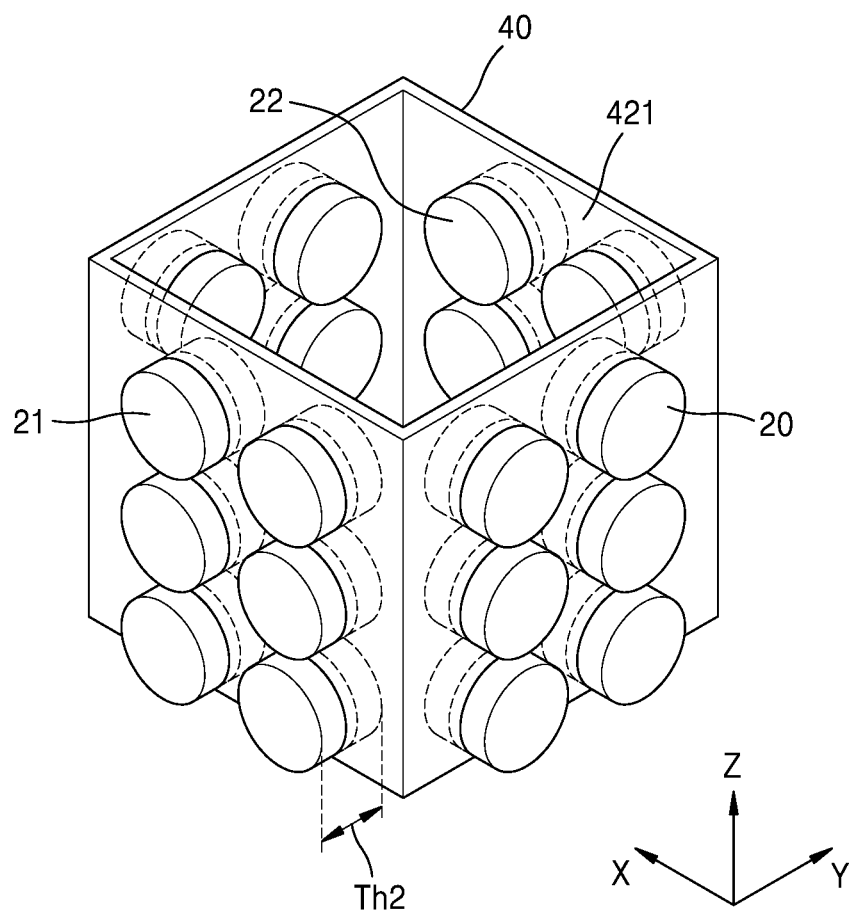
FIG. 5 is a perspective view of an embodiment of a second filter and a second filter supporter.
Figure 6:
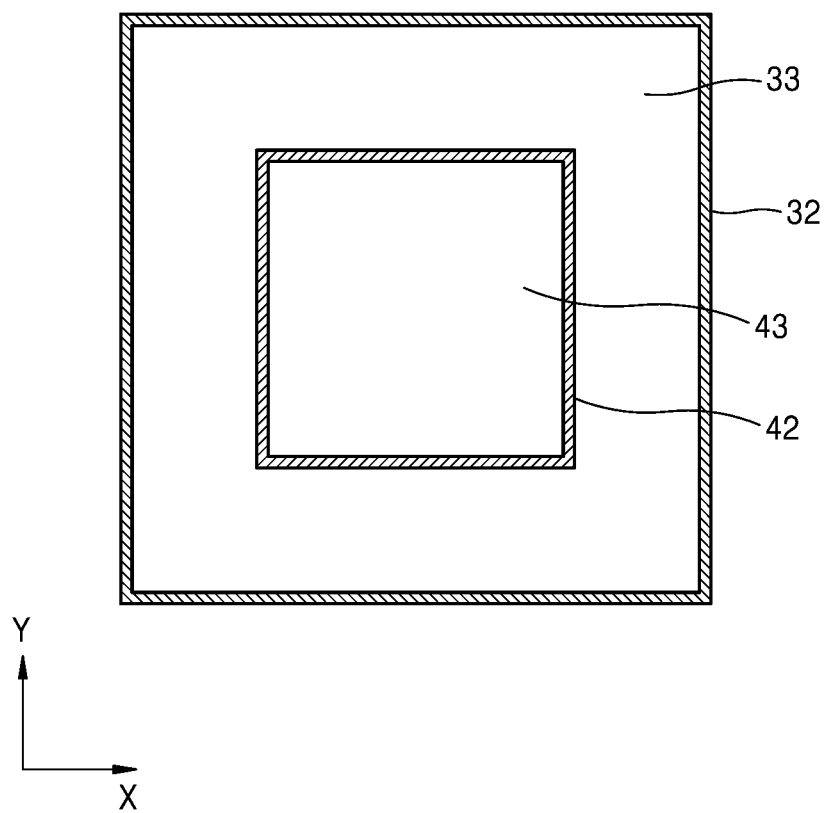
FIG. 6 is a plan view of an embodiment of a first filter supporter and a second filter supporter.
Figure 7:
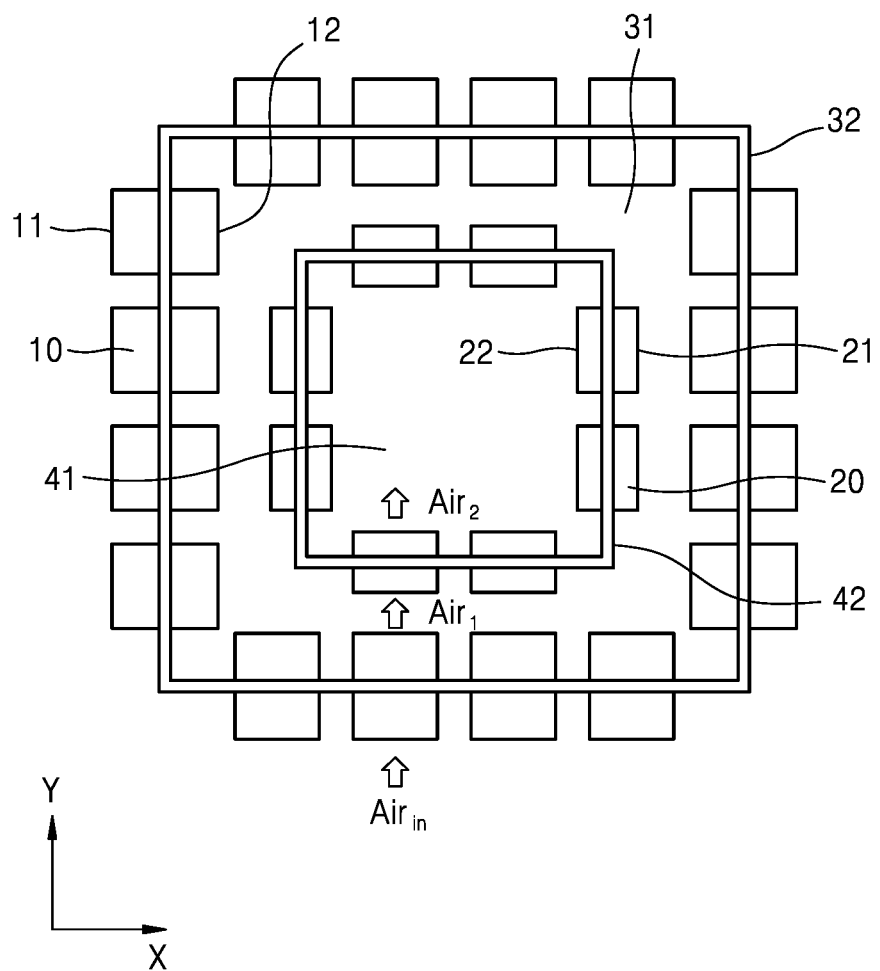
FIG. 7 is a plan view of an embodiment of a first filter, a second filter, a first filter supporter, and a second filter supporter.
Figure 8:
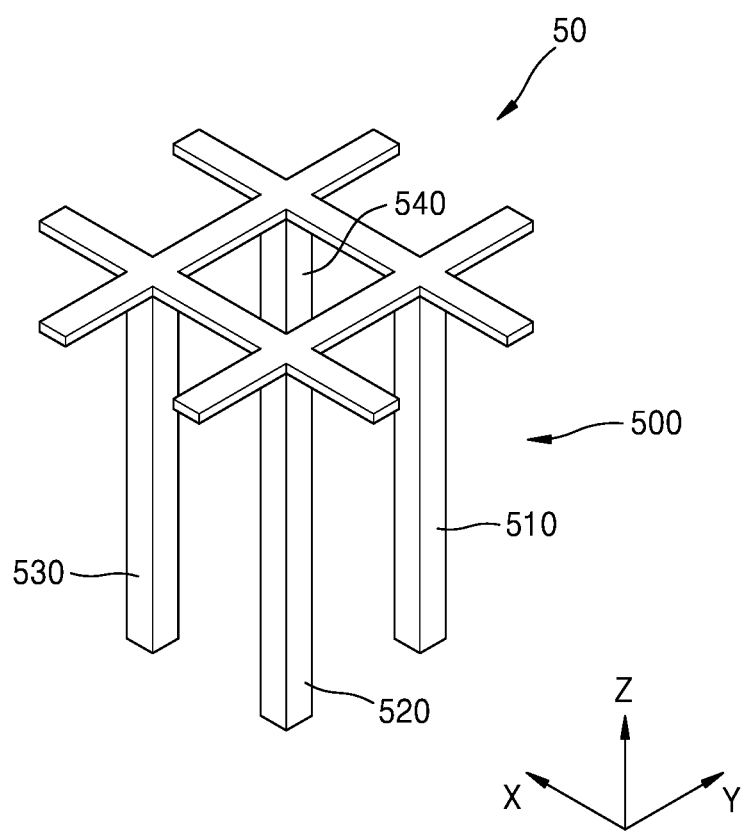
FIG. 8 is a perspective view of an embodiment of a light source module.

FIG. 2 is a perspective view of an embodiment of an air purification module 1. FIG. 3 is an exploded perspective view of an embodiment of the air purification module 1 of FIG. 2. FIG. 4 is a perspective view of the first filter 10 and a first filter supporter 30. FIG. 5 is a perspective view of an embodiment of a second filter 20 and a second filter supporter 40. FIG. 6 is a plan view of the first filter supporter 30 and the second filter supporter 40. FIG. 7 is a plan view of an embodiment of the first filter 10, the second filter 20, the first filter supporter 30, and the second filter supporter 40. FIG. 8 is a perspective view of an embodiment of a light source module 50.

Referring to FIGS. 2 through 8, the air purification module 1 in an embodiment may purify the introduced unpurified air $Air_{in}$ and discharge purified air Airout. In an embodiment, the air purification module 1 may include the first filter 10, the second filter 20, the first filter supporter 30 supporting the first filter 10, the second filter supporter 40 supporting the second filter 20, and the light source module 50, for example.

The first filter 10 may purify the unpurified air $Air_{in}$ introduced from the outside to obtain first purified air $Air_1$. The first filter 10 in an embodiment may include a (1-1)th filter surface 11 disposed at an upstream of an air flow and a (1-2)th filter surface 12 disposed at a downstream of the air flow. In an embodiment, the unpurified air $Air_{in}$ may be introduced through the (1-1)th filter surface 11, and the first purified air $Air_1$ may be discharged through the (1-2)th filter surface 12, for example. In an embodiment, the first filter 10 may be provided in a cylindrical shape in which the (1-1)th filter surface 11 and the (1-2)th filter surface 12 have circular shapes, for example. However, the disclosure is not limited thereto, and the (1-1)th filter surface 11 and the (1-2)th filter surface 12 may include circular shapes, oval shapes, or polygonal shapes.

In an embodiment, the first filter 10 may have a predetermined thickness Th1 in a direction extending from the (1-1)th filter surface 11 to the (1-2)th filter surface 12, for example. In an embodiment, the first filter 10 may have a thickness Th1 between about 0.1 centimeter (cm) and about 100 cm, in the direction extending from the (1-1)th filter surface 11 to the (1-2)th filter surface 12, for example. However, the disclosure is not limited thereto, and the first filter 10 may have any thickness capable of purifying the unpurified air $Air_{in}$.

In the first filter 10 in an embodiment, a dust collecting material including micro pores may be provided between the (1-1)th filter surface 11 and the (1-2)th filter surface 12. In an embodiment, fine dust or the like included in the unpurified air $Air_{in}$ that passed through the (1-1)th filter surface 11 may be adsorbed and removed by the dust collecting material provided between the (1-1)th filter surface 11 and the (1-2)th filter surface 12. In an embodiment, the first filter 10 may include one or more of a prefilter, a high-efficiency particulate air (HEPA) filter, a fabric filter, and a ceramic filter, for example. However, the disclosure is not limited thereto, and the first filter 10 may include any purification filter capable of purifying the unpurified air $Air_{in}$.

In an embodiment, a metal may be coated on one or more of the (1-1)th filter surface 11 and the (1-2)th filter surface 12 included in the first filter 10. In an embodiment, the metal coated on the (1-1)th filter surface 11 and the (1-2)th filter surface 12 may include one or more of copper (Cu), Cu alloy, silver (Ag), and platinum (Pt), for example. In an embodiment, when Cu is coated on one or more of the (1-1)th filter surface 11 and the (1-2)th filter surface 12, Cu ions may penetrate into a cell membrane of a microorganism included in the unpurified air $Air_{in}$ and disturb metabolism of the microorganism, thereby removing the microorganism through a method of destroying nucleic acid, for example.

The first filter supporter 30 may support one or a plurality of first filters 10. The first filter supporter 30 in an embodiment may extend in a first direction (Z direction) and be provided in a penetrating shape including a first hollow region 31 and a side portion 32 extending along a circumference portion of the first hollow region 31. In an embodiment, the first filter supporter 30 may include a first cross section 33 cut along one plane (XY plane) perpendicular to the first direction (Z direction). In an embodiment, the first cross section 33 may include a circular shape, an oval shape, or a polygonal shape, for example. Accordingly, the first filter supporter 30 may include one or more shapes from among a cylinder, an elliptic cylinder, and a polyprism.

In an embodiment, the first filter 10 may be supported by the first filter supporter 30 to penetrate the side portion 32 of the first filter supporter 30, for example. In an embodiment, when the plurality of first filters 10 is provided, the plurality of first filters 10 may be spaced apart from each other at predetermined intervals along a circumference portion of the side portion 32, for example.

In an embodiment, an outer section and a section of the first hollow region 31 may be defined by the side portion 32 of the first filter supporter 30. As described above, the first filter 10 may be supported by the first filter supporter 30 to penetrate the side portion 32 of the first filter supporter 30. Accordingly, the unpurified air $Air_{in}$ introduced from the outside may be discharged to the first hollow region 31 through the first filter 10. The primarily purified air discharged to the first hollow region 31 may be the first purified air $Air_1$.

The second filter 20 may purify the first purified air $Air_{in}$ introduced to the first hollow region 31 to obtain second purified air $Air_2$. The second filter 20 in an embodiment may include a (2-1)th filter surface 21 disposed at the upstream of the air flow and a (2-2)th filter surface 22 disposed at the downstream of the air flow. In an embodiment, the first purified air $Air_1$ may be introduced through the (2-1)th filter surface 21, and the second purified air $Air_2$ may be discharged through the (2-2)th filter surface 22, for example. In an embodiment, the second filter 20 may be provided in a cylindrical shape in which the (2-1)th filter surface 21 and the (2-2)th filter surface 22 have circular shapes, for example. However, the disclosure is not limited thereto, and the (2-1)th filter surface 21 and the (2-2)th filter surface 22 may include circular shapes, oval shapes, or polygonal shapes.

In an embodiment, the second filter 20 may have a predetermined thickness Th2 in a direction extending from the (2-1)th filter surface 21 to the (2-2)th filter surface 22, for example. In an embodiment, the second filter 20 may have a thickness Th2 between about 0.1 cm and about 100 cm, in the direction extending from the (2-1)th filter surface 21 to the (2-2)th filter surface 22, for example. However, the disclosure is not limited thereto, and the second filter 20 may have any thickness capable of purifying the first purified air $Air_1$.

In the second filter 20 in an embodiment, a dust collecting material including micro pores may be provided between the (2-1)th filter surface 21 and the (2-2)th filter surface 22. In an embodiment, fine dust or the like included in the first purified air $Air_1$ that passed through the (2-1)th filter surface 21 may be adsorbed and removed by the dust collecting material provided between the (2-1)th filter surface 21 and the (2-2)th filter surface 22, for example. In an embodiment, the second filter 20 may include one or more of a prefilter, a HEPA filter, a fabric filter, and a ceramic filter, for example. However, the disclosure is not limited thereto, and the second filter 20 may include any purification filter capable of purifying the first purified air $Air_1$.

In an embodiment, a metal may be coated on the (2-1)th filter surface 21 of the second filter 20. In an embodiment, the metal coated on the (2-1)th filter surface 21 may include one or more of Cu, Cu alloy, Ag, and Pt, for example. In an embodiment, when Cu is coated on the (2-1)th filter surface 21, CU ions may penetrate into a cell membrane of a microorganism included in the first purified air $Air_1$ and disturb metabolism of the microorganism, thereby removing the microorganism through a method of destroying nucleic acid, for example.

Also, in an embodiment, a photocatalyst may be coated on the (2-2)th filter surface 22 of the second filter 20. In an embodiment, the photocatalyst coated on the (2-2)th filter surface 22 may include a metal, a metal oxide, a metal carbide, a metal nitride, a metal oxynitride, or any combinations thereof, for example. In an embodiment, the metal may include titanium (Ti), zinc (Zn), zirconium (Zr), tantalum (Ta), niobium (Nb), tungsten (W), copper (Cu), platinum (Pt), gold (Au), silver (Ag), palladium (Pd), any alloys thereof, or any combinations thereof, for example. Also, the photocatalyst in an embodiment is in a form of a particle, the particle may have a sphere shape, a tube shape, a bar shape, a fiber shape, a sheet shape, or any combinations thereof, and the particle may be a primary particle or a secondary particle that is a combination of a plurality of primary particles.

The second filter supporter 40 may be disposed in the first hollow region 31 provided in the first filter supporter 30, and support one or a plurality of second filters 20. The second filter supporter 40 in an embodiment may extend in the first direction (Z direction) and be provided in a penetrating shape including a second hollow region 41 and a side portion 42 extending along a circumference portion of the second hollow region 41. In an embodiment, the second filter supporter 40 may include a second cross section 43 cut along one plane (XY plane) perpendicular to the first direction (Z direction), for example. In an embodiment, the second cross section 43 may include a circular shape, an oval shape, or a polygonal shape, for example. Accordingly, the second filter supporter 40 may include one or more shapes from among a cylinder, an elliptic cylinder, and a polyprism.

In an embodiment, the second filter 20 may be supported by the second filter supporter 40 to penetrate the side portion 42 of the second filter supporter 40, for example. In an embodiment, when the plurality of second filters 20 is provided, the plurality of second filters 20 may be spaced apart from each other at predetermined intervals along a circumference portion of the side portion 42, for example.

In an embodiment, sections of the first hollow region 31 and second hollow region 41 may be defined by the side portion 42 of the second filter supporter 40. As described above, the second filter 20 may be supported by the second filter supporter 40 to penetrate the side portion 42 of the second filter supporter 40. Accordingly, the first purified air $Air_1$ introduced to the first hollow region 31 through the first filter 10 may be discharged to the second hollow region 41 through the second filter 20. Secondarily purified air discharged to the second hollow region 41 may be the second purified air Aire.

As described above, the unpurified air $Air_{in}$ may be primarily purified while being introduced to the first hollow region 31 of the first filter supporter 30 through the first filter 10, e.g., the (1-1)th filter surface 11 and the (1-2)th filter surface 12. Also, the first purified air $Air_1$ may be secondarily purified while being introduced to the second hollow region 41 of the second filter supporter 40 through the second filter 20, e.g., the (2-1)th filter surface 21 and the (2-2)th filter surface 22. In other words, the unpurified air $Air_{in}$ may go through a purification process twice while defining a flow path of air from the (1-1)th filter surface 11, the (1-2)th filter surface 12, the first hollow region 31, the (2-1)th filter surface 21, and the (2-2)th filter surface 22 to the second hollow region 41.

The light source module 50 may be disposed in the second hollow region 41 of the second filter supporter 40 and activate the photocatalyst coated on the (2-2)th filter surface 22. The light source module 50 in an embodiment may irradiate light of a predetermined wavelength that may activate the photocatalyst coated on the (2-2)th filter surface 22. In an embodiment, the light irradiated from the light source module 50 may include radio waves, microwaves, ultraviolet light, visible light, infrared light, x-rays, or any combinations thereof, which activates the photocatalyst, for example.

The light source module 50 in an embodiment may include one or a plurality of light sources 500. In an embodiment, the one or plurality of light sources 500 may include one or more of an incandescent lamp, a halogen lamp, a fluorescent lamp, a mercury lamp, a fluorescent mercury lamp, a metal halide lamp, a xenon lamp, a low-pressure sodium lamp, a high-pressure sodium lamp, and a light-emitting diode ("LED"), for example. The light source 500 in an embodiment may irradiate the light of the predetermined wavelength to an inner surface 421 of the side portion 42 of the second filter supporter 40. However, the disclosure is not limited thereto, and the light source 500 in an embodiment may irradiate the light of the predetermined wavelength only to the (2-2)th filter surface 22.

In an embodiment, the light source 500 may include one or more light sources e.g., a first light source 510 through a fourth light source 540, extending in the first direction (Z direction). A plurality of the light sources, e.g., the first light source 510 through the fourth light source 540, may be spaced apart from each other at predetermined intervals in a second direction (X direction) or third direction (Y direction) perpendicular to the first direction (Z direction). Accordingly, uniform light may be irradiated to the inner surface 421 of the side portion 42 of the second filter supporter 40.

In the above embodiment, the light source 500 extends in the first direction (Z direction), but the disclosure is not limited thereto. In an embodiment, the light source 500 may include one or more light sources (not shown) extending in the second direction (X direction) or third direction (Y direction) perpendicular to the first direction (Z direction), for example. Here, a plurality of the light sources may be spaced apart from each other in the second direction (X direction) so as to irradiate uniform light to the inner surface 421 of the side portion 42 of the second filter supporter 40.

In an embodiment, the second purified air $Air_2$ introduced to the second hollow region 41 may be purified by the photocatalyst activated by the light irradiated from the light source module 50 to obtain third purified air $Air_3$. In an embodiment, when $Cu_2O/TiO_2$ is coated as the photocatalyst on the (2-2)th filter surface 22, the photocatalyst may be activated by the light, e.g., ultraviolet light, irradiated from the light source module 50. An organic compound included in the second purified air $Air_2$ that passed through the second filter 20 may be decomposed by the activated photocatalyst, for example. Also, microorganisms of about 5 µm or less included in the second purified air $Air_2$ that passed through the second filter 20 may be sterilized by the activated photocatalyst. Air purified by the activated photocatalyst may be the third purified air $Air_3$. Accordingly, the unpurified air $Air_{in}$ may be purified three times by the first filter 10, the second filter 20, and the activated photocatalyst.

In an embodiment, purification efficiency by the activated photocatalyst may increase as a time during which the second purified air $Air_2$ introduced to the second hollow region 41 through the second filter 20 remains in the second hollow region 41 increases. In an embodiment, the unpurified air $Air_{in}$ passes through the first filter 10 and the second filter 20, which include micro pores, while defining the flow path of air from the first filter 10, the first hollow region 31, and the second filter 20 to the second hollow region 41. When the unpurified air $Air_{in}$ passes through the first filter 10 and the second filter 20, the flow path of air may extend compared to when the unpurified air $Air_{in}$ passes through one filter, and thus flow velocity of the second purified air $Air_2$ introduced to the second hollow region 41 may decrease. In other words, the flow velocity of the second purified air $Air_2$ introduced to the second hollow region 41 through the first filter 10 and the second filter 20 may be less than flow velocity of the first purified air $Air_1$ introduced to the first hollow region 31 through the first filter 10. Accordingly, a time during which the second purified air $Air_2$ remains in the second hollow region 41 may increase. When the time during which the second purified air $Air_2$ remains in the second hollow region 41 increases, a time during which the second purified air $Air_2$ and the activated photocatalyst contact each other may increase, and thus the purification efficiency may increase.

Also, in an embodiment, energy efficiency of the light source module 50 may increase as the area of the inner surface 421 of the side portion 42 of the second filter supporter 40, on which the light is irradiated by the light source module 50, decreases. In an embodiment, light of predetermined intensity or greater needs to be incident to activate the photocatalyst coated on the (2-2)th filter surface 22, for example. When the area of the inner surface 421 of the side portion 42 of the second filter supporter 40 decreases, power consumption of a light source irradiated by the light source module 50 may also decrease.

In an embodiment, the air purification module 1 may be divided into two spaced by the first filter supporter 30 and the second filter supporter 40. In an embodiment, the first filter supporter 30 may include the first cross section 33 cut along one plane (XY plane) perpendicular to the first direction (Z direction). Also, in an embodiment, the second filter supporter 40 may include the second cross section 43 cut along one plane (XY plane) perpendicular to the first direction (Z direction). In an embodiment, when the first filter supporter 30 and the second filter supporter 40 extend identically in the first direction (Z direction), the area of the inner surface 421 of the side portion 42 of the second filter supporter 40 may increase or decrease according to a cross-sectional area of the second cross section 43 where the light source module 50 is disposed.

In an embodiment, when the second filter supporter 40 is disposed in the first hollow region 31 of the first filter supporter 30, a cross-sectional area of the first cross section 33 may exceed the cross-sectional area of the second cross section 43. In an embodiment, a ratio of the cross-sectional area of the second cross section 43 to the cross-sectional area of the first cross section 33 may be between 0.01 and 0.99, for example. When the light source module 50 irradiates light to the inner surface 421 of the side portion 42 of the second filter supporter 40, the light source module 50 may irradiate light to the area smaller than an inner surface 321 of the side portion 32 of the first filter supporter 30, and thus power consumption of a light source irradiated by the light source module 50 may be decreased.

Hereinafter, the disclosure will be described in further detail through an example and a comparative example. Here, the example is to illustrate the disclosure, and the scope of the disclosure is not limited thereto.

Figure 9:
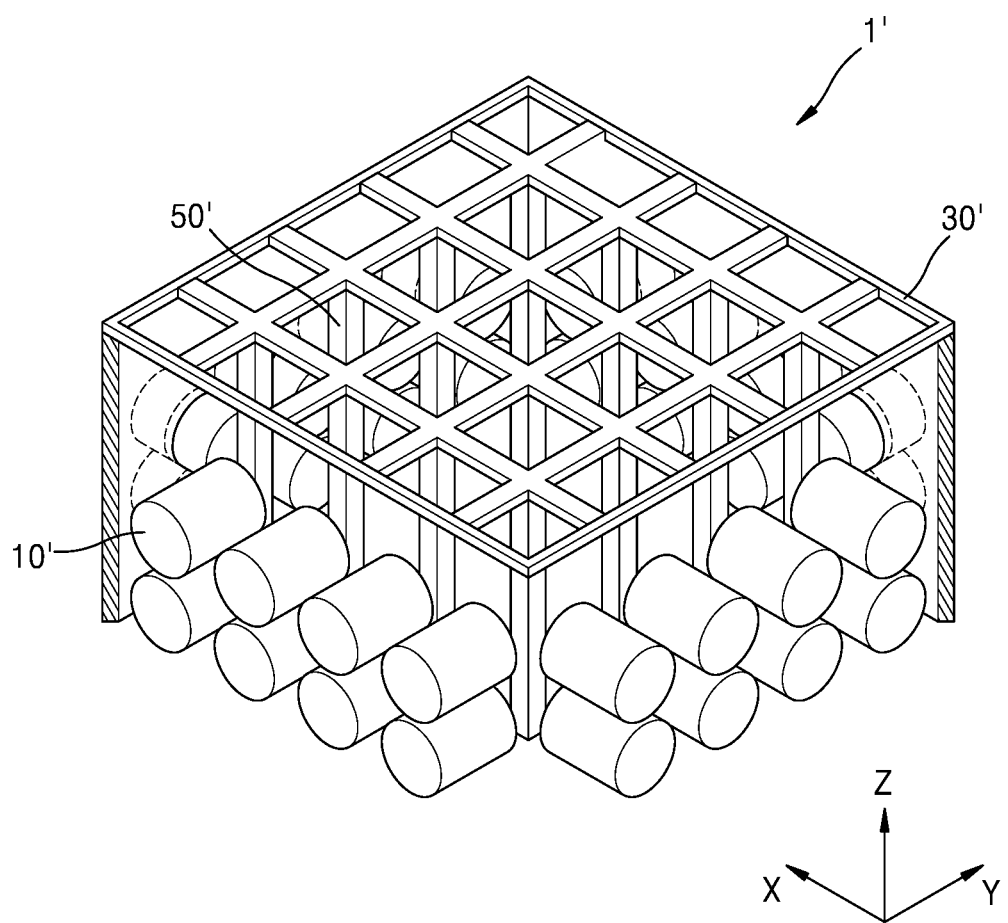
FIG. 9 is a perspective view of a comparative example of an air purification module.

FIG. 9 is a perspective view of a comparative example of an air purification module 1'.

(Manufacture of Air Purification Module)

EMBODIMENT

Referring to FIGS. 2 and 3, the air purification module 1 in an embodiment, in which the first filter 10, the second filter 20, and the light source module 50 are sequentially arranged in a direction from an upstream to a downstream of an air flow, is prepared. The light source module 50 uses a xenon ultraviolet-C("UVC") lamp (15 watts (W)).

The volume of the first filter supporter 30 supporting the first filter 10 is 1 cubic meter ($m^3$) (1 m (width)×1 m (length)×1 m (height)). Also, the volume of the second filter supporter 40 supporting the second filter 20 is 0.25 $m^3$ (0.5 m (width)×0.5 m (length)×1 m (height)).

COMPARATIVE EXAMPLE

Referring to FIG. 9, the air purification module 1' according to a comparative example, in which a first filter 10' supported by a first filter supporter 30' and a light source module 50' are sequentially arranged in a direction from an upstream to a downstream of an air flow, is prepared. The light source module 50' uses a xenon UVC lamp (15 W).

The volume of a first filter supporter 20' supporting the first filter 10' is 1 $m^3$ (1 m (width)×1 m (length)×1 m (height)).

<Evaluation: Volume and Power Consumption Comparison>

Results of comparing the volume and power consumption of the air purification module where the light source module 50 is disposed and the air purification module 1' where the light source module 50' is disposed, which are prepared in the Embodiment and the comparative example are shown in Table 1 below.

TABLE 1

|  | Volume of Air Purification Module [$m^3$] | Power Consumption [Wh] |
| --- | --- | --- |
| Embodiment | 0.25 | 177 |
| Comparative Example | 1 | 706 |

As shown in Table 1, the volume of the air purification module 1 of the Embodiment is decreased by at least 75% compared to the volume of the air purification module 1' of the comparative example in terms of watt-hour (Wh).

The power consumption of the air purification module 1 of the Embodiment is decreased by at least 75% compared to the power consumption of the air purification module 1' of the comparative example.

It is identified that the air purification module 1 of the Embodiment provides reduced volume and enhanced energy efficiency compared to the air purification module 1' of the comparative example.

An air purification module in an embodiment may have an improved purification performance regarding pollutants by arranging a purifier of a plurality of stages.

An air purification module in another embodiment may increase a time during which contaminated air is exposed to an activated photocatalyst, by dividing a region where the contaminated air passes through into a plurality of regions and decreasing flow velocity of the contaminated air while the contaminated air passes through the plurality of regions, thereby improving a purification performance.

An air purification module in another embodiment may enhance energy efficiency by dividing a region where contaminated air passes through into a plurality of regions and arranging a light source module in one of the plurality of regions.

It should be understood that embodiments described herein should be considered in a descriptive sense only and not for purposes of limitation. Descriptions of features or advantages within each embodiment should typically be considered as available for other similar features or advantages in other embodiments. While embodiments have been described with reference to the drawing figures, it will be understood by those of ordinary skill in the art that various changes in form and details may be made therein without departing from the spirit and scope as defined by the following claims.

What is claimed is:

1. An air purification module which purifies introduced unpurified air and discharge purified air, the air purification module comprising:
    a first filter supporter extending in a first direction and having a penetrating shape including a first hollow region;
    a first filter which is supported by the first filter supporter and penetrates a side portion of the first filter supporter;
    a second filter supporter extending in the first direction, having a penetrating shape including a second hollow region, and disposed in the first hollow region;
    a second filter which is supported by the second filter supporter and penetrates a side portion of the second filter supporter; and
    a light source module disposed in the second hollow region.

2. The air purification module of claim 1, wherein at least one of the first filter and the second filter comprises at least one of a prefilter, a high-efficiency particulate air filter, a fabric filter, and a ceramic filter, which include micro pores.

3. The air purification module of claim 1, wherein the first filter comprises a (1-1)th filter surface disposed at an upstream of an air flow and a (1-2)th filter surface disposed at a downstream of the air flow,
the second filter comprises a (2-1)th filter surface disposed at the upstream of the air flow and a (2-2)th filter surface disposed at the downstream of the air flow,
a thickness of the first filter extending from the (1-1)th filter surface to the (1-2)th filter surface is between about 0.1 centimeter and about 100 centimeter, and
a thickness of the second filter extending from the (2-1)th filter surface to the (2-2)th filter surface is between about 0.1 centimeter and about 100 centimeter.

4. The air purification module of claim 3, wherein the unpurified air defines a flow path of air from the (1-1)th filter surface, the (1-2)th filter surface, the first hollow region, the (2-1)th filter surface, and the (2-2)th filter surface to the second hollow region.

5. The air purification module of claim 1, wherein the first filter comprises a (1-1)th filter surface disposed at an upstream of an air flow and a (1-2)th filter surface disposed at a downstream of the air flow, and
at least one of copper (Cu), Cu alloy, silver (Ag), and platinum (Pt) are coated on at least one of the (1-1)th filter surface and the (1-2)th filter surface.

6. The air purification module of claim 1, wherein a ratio of a cross-sectional area of a second cross section of the second filter supporter cut along one plane perpendicular to the first direction to a cross-sectional area of a first cross section of the first filter supporter cut along one plane perpendicular to the first direction is between 0.01 and 0.99.

7. The air purification module of claim 1, wherein a shape of a first cross section of the first filter supporter cut along one plane perpendicular to the first direction and a shape of a second cross section of the second filter supporter cut along one plane perpendicular to the first direction comprise at least one of a circle, an oval, and a polygon.

8. The air purification module of claim 1, wherein the second filter comprises a (2-1)th filter surface disposed at an upstream of the air flow, and at least one of Cu, Cu alloy, Ag, and Pt are coated on the (2-1)th filter surface.

9. The air purification module of claim 1, wherein the second filter comprises a (2-2)th filter surface disposed at a downstream of the air flow, and a photocatalyst is coated on the (2-2)th filter surface.

10. The air purification module of claim 9, wherein the photocatalyst comprises at least one of a metal, a metal oxide, a metal carbide, a metal nitride, a metal oxynitride,
the metal comprises at least one of titanium (Ti), zinc (Zn), zirconium (Zr), tantalum (Ta), niobium (Nb), tungsten (W), copper (Cu), platinum (Pt), gold (Au), silver (Ag), and palladium (Pd),
the photocatalyst includes a particle,
the particle has at least one of a sphere shape, a tube shape, a bar shape, a fiber shape, a sheet shape, and
the particle is a primary particle or a secondary particle which is a combination of a plurality of primary particles.

11. The air purification module of claim 9, wherein light irradiated from the light source module comprises at least one of radio waves, microwaves, ultraviolet light, visible light, infrared light, and x-rays, which activates the photocatalyst.

12. The air purification module of claim 11, wherein a light source included in the light source module comprises at least one of an incandescent lamp, a halogen lamp, a fluorescent lamp, a mercury lamp, a fluorescent mercury lamp, a metal halide lamp, a xenon lamp, a low-pressure sodium lamp, a high-pressure sodium lamp, and a light-emitting diode.

13. The air purification module of claim 1, wherein the light source module comprises light sources extending in the first direction,
wherein the light sources are spaced apart from each other at predetermined intervals in a second direction or a third direction perpendicular to the first direction.

14. The air purification module of claim 1, wherein the light source module comprises light sources extending in a second direction or a third direction perpendicular to the first direction,
wherein the light sources are spaced apart from each other at predetermined intervals in the first direction.

15. An air purification system comprising:
a first air purification module comprising:
a first filter supporter extending in a first direction and having a penetrating shape including a first hollow region;
a first filter which is supported by the first filter supporter and penetrates a side portion of the first filter supporter;
a second filter supporter extending in the first direction, having a penetrating shape including a second hollow region, and disposed in the first hollow region;
a second filter which is supported by the second filter supporter and penetrates a side portion of the second filter supporter; and
a light source module disposed in the second hollow region; and
an air discharge module disposed at a downstream of an air flow compared to the first air purification module.

16. The air purification system of claim 15, further comprising a second air purification module disposed between the first air purification module and the air discharge module,
wherein the second air purification module comprises a catalyst filter and a light-emitting heat source.

17. The air purification system of claim 16, wherein the catalyst filter comprises a photocatalyst and an oxidation catalyst, and the light-emitting heat source irradiates light activating the photocatalyst and provides heat activating the oxidation catalyst.

18. The air purification system of claim 15, wherein the first filter or the second filter is a ceramic filter including micro pores.

19. The air purification system of claim 15, wherein the second filter comprises a (2-1)th filter surface disposed at an upstream of an air flow, and copper is coated on the (2-1)th filter surface.

20. The air purification system of claim 15, wherein the second filter comprises a (2-2)th filter surface disposed at a downstream of an air flow, and a photocatalyst is coated on the (2-2)th filter surface.

* * * * *